July 28, 1959 — P. McBRIDE HART ET AL — 2,897,000
PIVOTED ARM REST ASSEMBLY FOR VEHICLE BODY
Filed Dec. 12, 1956 — 2 Sheets-Sheet 1

INVENTORS
Peter McBride Hart, &
BY Aloys Charles Hollerbach
W. S. Pettigrew
ATTORNEY

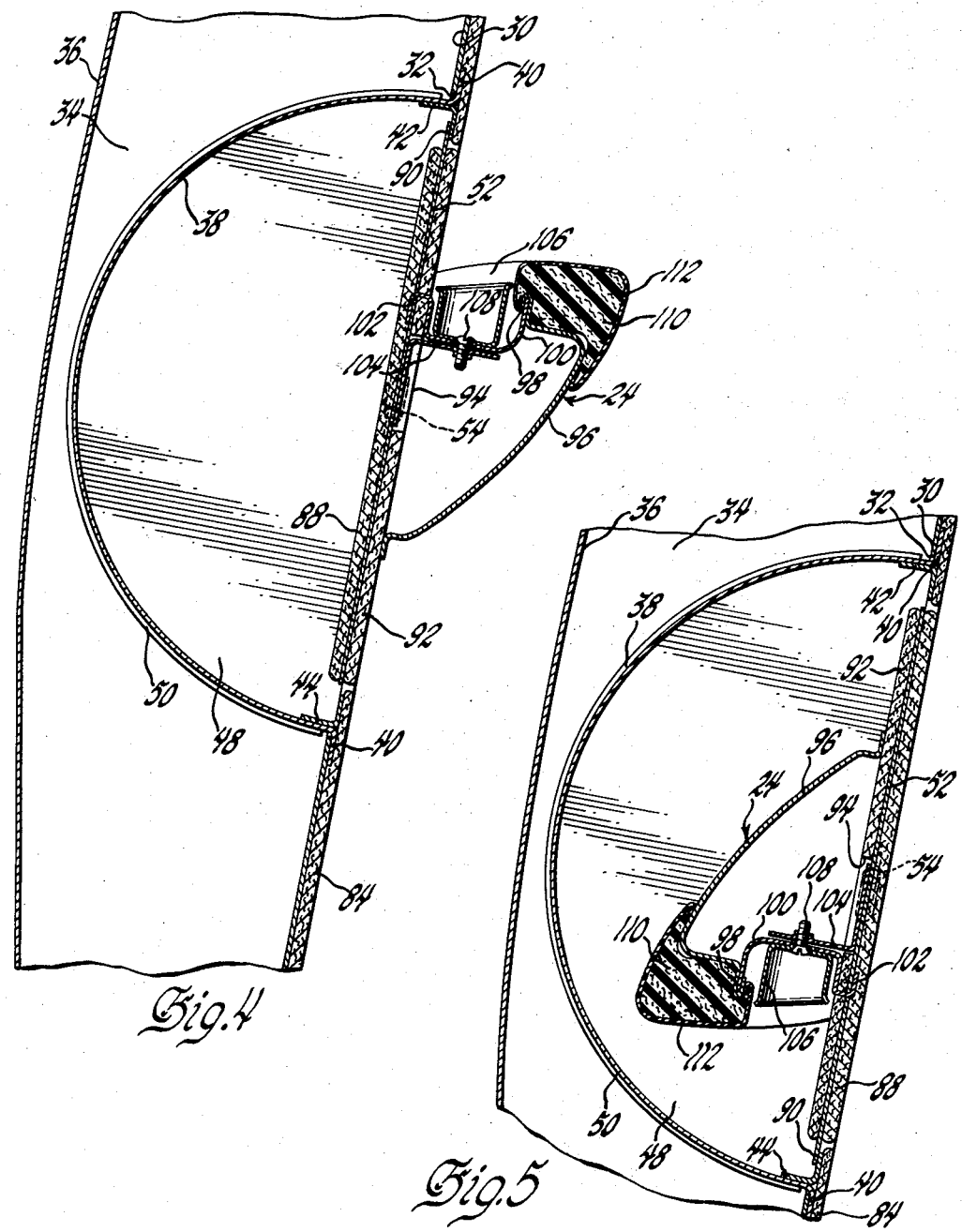

United States Patent Office 2,897,000
Patented July 28, 1959

2,897,000

PIVOTED ARM REST ASSEMBLY FOR VEHICLE BODY

Peter McBride Hart, Royal Oak, and Aloys Charles Hollerbach, Grosse Pointe Park, Mich., assignors to General Motors Corporation, Detroit, Mich., a corporation of Delaware Application December 12, 1956, Serial No. 627,850

5 Claims. (Cl. 296—44)

This invention relates to an arm rest assembly and more particularly to an arm rest assembly for vehicle bodies which is movable between an operative position wherein the assembly may be used by a passenger and a concealed out-of-the-way position.

The arm rest assembly of this invention is particularly intended for use in vehicle bodies provided with a seat which includes a tilting seat back movable between a normal upright position and a position overlying the seat cushion to provide increased access room to and from the rear of the seat. In many such bodies the seat back cannot be moved while the door is in closed position due to intereference between the seat back and the door arm rest. By providing doors of such bodies with arm rests according to this invention, the arm rest may be moved to an out-of-the-way position so as to allow tilting movement of the seat back regardless of whether the door is in open or closed position. Thus, the door need not be opened in order to move the seat back over the seat cushion and similarly the seat back need not be returned to an upright position before the door is closed.

The primary object of this invention is to provide a new and improved arm rest assembly for vehicle bodies. Another object of this invention is to provide a new and improved arm rest assembly for vehicle bodies which is movable to an out-of-the-way position so as not to extend within the passenger compartment of the body when the arm rest is not in use. A further object of this invention is to provide an arm rest assembly for vehicle bodies which is movable between an operative and an out-of-the-way position within an opening in a body panel and which conceals the opening in either position thereof.

These and other objects of this invention will be readily apparent from the following specification and drawings, in which:

Figure 4 is an enlarged view taken on the plane indicated by line 4—4 of Figure 1; and Figure 5 is a view similar to Figure 4 and showing the arm rest in an out-of-the-way position.

Figure 1:
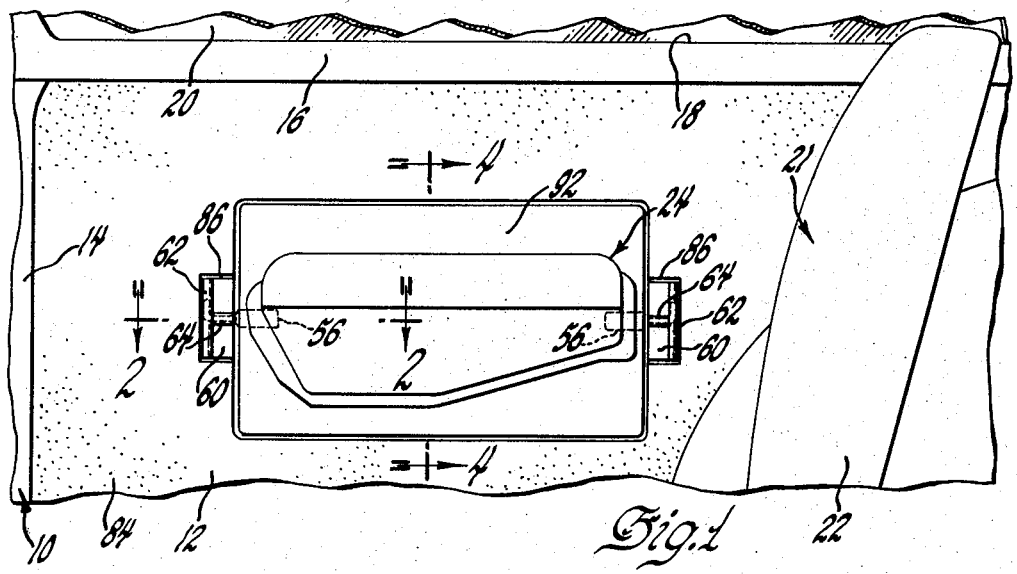
Figure 1 is a partial side elevational view of a vehicle body embodying an arm rest on one of the doors thereof according to this invention, with the arm rest being shown in operative position.

Referring now to Figure 1 of the drawings, a vehicle body 10 includes a door 12 movable between open and closed positions by means of a suitable hinge arrangement at the forward edge 14 of the door. The door includes an upper door frame 16 providing a window opening 18 which may be opened and closed by a vertically movable window 20. A seat 21 is mounted within the body and includes a seat bottom (not shown) and a seat back 22 which is pivotally supported by the seat bottom for movement between a normally upright position, as shown, and a forwardly tilted position wherein the seat back extends over the seat bottom. The clearance between the seat back 22 and the door 12 is such that the seat back will not clear the usual door arm rest if the seat back is tilted forwardly and the door is in closed position. Similarly, if the door were in open position, the seat back could be tilted forwardly but could not remain in this position if the door were closed. This invention solves this problem by providing an arm rest assembly 24 which is movable between an operative position as shown in Figure 1 and an out-of-the-way position as shown in Figure 5 when not in use to allow tilting movement of the seat back regardless of whether the door is in open or closed position.

Figure 2:
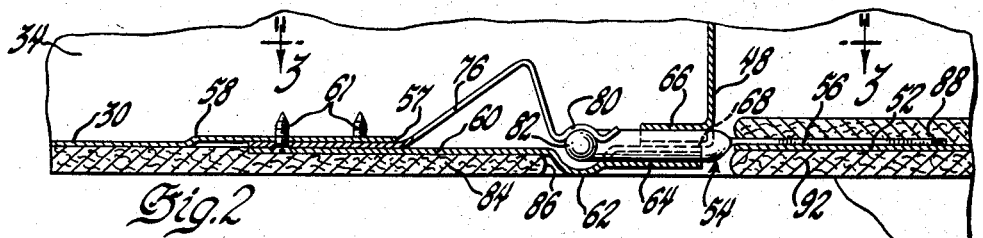
Figure 2 is an enlarged sectional view taken on the plane indicated by line 2—2 of Figure 1.
Figure 3:
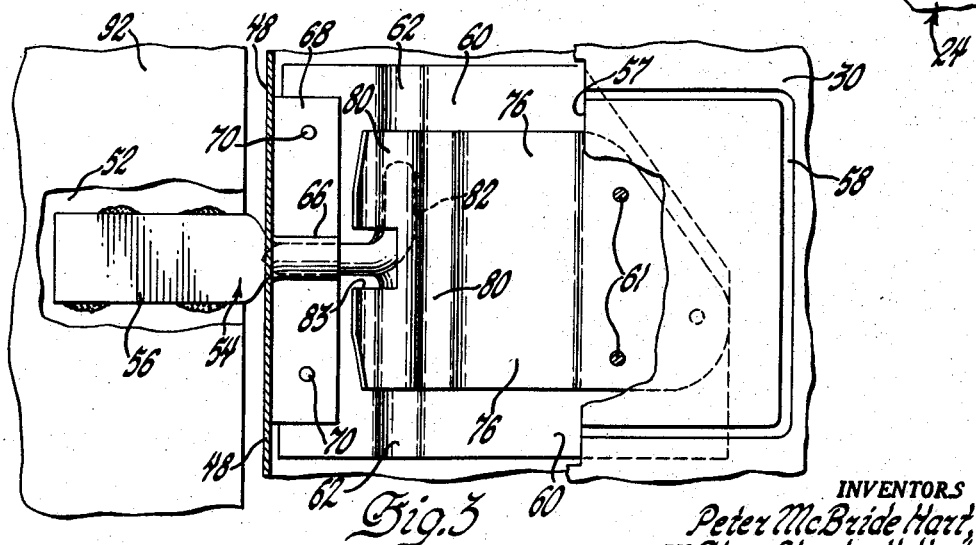
Figure 3 is a view taken on the plane indicated by line 3—3 of Figure 2.

Referring now particularly to Figures 2, 3, and 4 of the drawings, the arm rest assembly will be described. The door inner panel 30 of door 12 is provided with a substantially rectangularly shaped opening 32 affording access into the door well 34 which is defined by the door inner panel and the door outer panel 36. A semi-cylindrical housing 38 fits within the opening 32 and is provided with upper and lower flanges 40 which bear against the outer surface of the door inner panel adjacent the upper and lower edges of opening 32 and are spot welded thereto in order to mount the housing within the door well 34. Upper and lower angle brackets 42 and 44, respectively, have one leg thereof spot welded or otherwise secured to housing 38 adjacent flanges 40 and project within the opening of the housing for a purpose to be described. A semi-cylindrical end plate 48 is provided at each side of housing 38 and is secured to the housing by spot welding a flange 50 of the end plate thereto.

A plate 52 of smaller size than the opening of housing 38 has a hinge arm 54 secured to opposite ends thereof. The hinge arm is L-shaped and has a flattened end 56 which is spot welded or otherwise secured to the plate 52. The door inner panel 30 is provided with cut-out portions 57 on the opposite side of the opening 32 therein, and is offset outwardly at 58 as may be seen in Figures 2 and 3. A cover plate 60 secured to each offset portion 58 of the door inner panel by a number of screws 61 includes an arcuate inwardly extending transverse embossment 62 and an arcuate inwardly extending embossment 64 transverse to embossment 62 and providing one portion of the hinge bearing for the hinge arm 54. The other portion of the hinge bearing is provided by an outwardly extending arcuate embossment 66 in a flange 68 of each end plate 48 which is secured to the door inner panel 30 on either side of the cut-out portion 57 and is secured to cover plate 60 within cut-out portion 57 by screws 70. Thus, each hinge arm 54 of plate 57 is rotatably supported on the door inner panel by the complementary hinge bearing portions of plate 60 and end plate 48 for swinging movement through an arc of 180° about an axis which is transverse of the plate and of the opening in the inner panel.

An offset spring 76 has one end thereof fitting between each cover plate 60 and offset portion 58 of the door inner panel and is secured to the door inner panel by the screws 61. The end of the spring terminates in an arcuately shaped flange portion 80 which is adapted to engage the leg 82 of the hinge arm to hold the hinge arm in either terminal position thereof and to bias the hinge arm to either terminal position from an intermediate position wherein the leg 82 of the arm would be located substantially normal to the cover plate 60 and the plane of opening 32. The flange portion 80 is cut out at 83 to allow leg 82 to engage flange portion 80 in either position thereof.

The door inner panel 30 is covered by a trim pad 84 which extends over the upper and lower brackets 42 and 44 and is provided with cut-out portions 86 in the area of the plates 60. A trim pad 88 similar to trim pad 84 is secured in a suitable manner to one side of the plate 52 and terminates short of one edge 90 thereof. A trim pad 92 coextensive with trim pad 88 but having a central opening 94 is secured to the other side of plate 52 opposite trim pad 88. An arm rest support includes an arcuately shaped outer member 96 having an upper terminal return bent flanged edge 98 which receives one edge of a U-shaped mounting cup 100. The other edge of the mounting cup 100 terminates in a hook 102 which extends through suitable openings in the trim pad 92 and plate 52 into engagement with the one side of the plate to which it is secured in a suitable manner. An angular bracket 104 is spot welded or otherwise secured to the other side of plate 52 within the opening 94 defined by trim pad 92 and extends outwardly from plate 52 immediately adjacent the base of mounting cup 100. A finger grip cup 106 is secured to bracket 104 and the base of mounting cup 100 by screws 108. A resilient covering 110 is secured to the member 96 around the upper edge portion thereof and provided with a decorative cover 112 in order to provide a resilient support for the arm of the passenger.

When the arm rest assembly is in its operative position as may be seen in Figures 3 and 4, one edge 90 of the plate 52 bears against bracket 42 to provide a limit stop. The arm rest assembly is held in this position by engagement of each of the springs 76 with the legs 82 of hinge arms 54, with the trim pad 92 concealing the openings of the door trim pad and housing 38 and also fitting flush with the door trim pad. When it is desired to move the arm rest to an out-of-the-way position, as shown in Figure 5, the plate 52 is pushed counterclockwise about the hinge axis defined by hinge arms 54 so that the one edge 90 of the plate now bears against the bracket 44 to provide a limit stop, with the trim pad 88 now concealing the openings of the door trim pad and housing 38 and fitting flush with the door trim pad. During this movement of the arm rest assembly, the legs 82 of hinge arms 54 move against the action of each of the springs 76 until the legs 82 and plate 52 are substantially normal to the cover plate 60 and the plane of the openings of the door trim pad and housing 38, with the ends of the legs in engagement with the flanged portion 80 of springs 76. Thereafter, as the legs 82 and plate 52 move beyond this position, the springs 76 aid in biasing the plate 52 to its position of Figure 5 wherein the legs point downwardly rather than upwardly as in the position of the plate in Figure 4. The action of the springs 76 on legs 82 acts to retain the plate 52 in either position thereof should the plate be accidentally pushed in a manner so as to initially move it towards the opposite position thereof. Thus, if the plate is in its position of Figure 4 and is accidentally pushed counterclockwise, the springs 76 will act to return the plate to its position of Figure 4 from any position intermediate this position and a position wherein the plate is transverse of the opening. Similarly, if the plate is in its position of Figure 5 and it is accidentally pushed clockwise, the springs 76 will act to return the plate to its position of Figure 5 from any position intermediate this position and a position wherein the plate is transverse of the opening.

Thus, the arm rest assembly may be moved between an operative position and an out-of-the-way position with respect to an opening in the door inner panel and yet conceals the opening in either position thereof. When the arm rest assembly is in its operative position, as shown in Figure 4, the trim pad 92 on the one side of plate 52 is substantially co-extensive with the opening in the door trim pad 84 so as to conceal this opening and the opening of housing 38 from view. Similarly, when the arm rest assembly has been rotated 180° to its out-of-the-way position, as shown in Figure 5, the trim pad 88 on the other side of the plate 52 fits within the opening in the door trim pad and is substantially co-extensive therewith to close this opening and the opening of housing 38 from view.

We claim:
1. In combination with a vehicle body panel having an opening therein, an arm rest support having opposite sides, an arm rest mounted on one side of said support, hinge pin means secured to said support, means rotatably mounting said hinge pin means on said panel to thereby mount said support on said panel for movement between a first position wherein said one side of said support fits within said opening substantially flush with said panel, with said arm rest being disposed outwardly thereof in an operative position, and a second position wherein the opposite side of said support fits within said opening substantially flush with said panel, with said arm rest being disposed inwardly thereof in an out of the way position, and means on said panel engageable with said hinge pin means in said first and second positions of said support to resiliently retain said support in each of said positions against movement toward the other of said positions.

2. In combination with a vehicle body panel having an opening therein, an arm rest support having opposite sides, an arm rest mounted on one side of said support, hinge pin means secured to said support, means rotatably mounting said hinge pin means on said panel to thereby mount said support on said panel for movement between a first position wherein said one side of said support fits within said opening substantially flush with said panel, with said arm rest being disposed outwardly thereof in an operative position, and a second position wherein the opposite side of said support fits within said opening substantially flush with said panel, with said arm rest being disposed inwardly thereof in an out of the way position, and resilient means on said panel engageable with said hinge pin means in said first and second positions of said support to resiliently retain said support in either position thereof and to resiliently bias said support to said positions from any position adjacent thereto.

3. In combination with a vehicle body panel having an opening therein, an arm rest support member having one edge portion thereof coextensive with opposite edge portions of said opening and the other edge portion thereof extending beyond opposite edge portions of said opening, an arm rest mounted on one side of said member, hinge pin means secured to said support member, and means rotatably mounting said hinge pin means on said panel to mount said member on said panel for movement between a first position wherein one side of said member closes said opening, with said other edge portion thereof in engagement with said panel adjacent one of said opposite edge portions of said opening to locate said arm rest to one side of said opening in an operative position, and a second position wherein the opposite side of said member closes said opening with said other edge portion thereof in engagement with said panel adjacent the other of said opposite edge portions of said opening to locate said arm rest to the other side of said opening in an out-of-the-way position.

4. In combination with a vehicle body panel having an opening therein, an arm rest support member having one edge portion thereof coextensive with opposite edge portions of said opening and the other edge portion thereof extending beyond opposite edge portions of said opening, an arm rest mounted on one side of said member, hinge pin means secured to said support member, means rotatably mounting said hinge pin means on said panel to mount said member on said panel for movement between a first position wherein one side of said member closes said opening, with said other edge portion thereof in engagement with said panel adjacent one of said opposite edge portions of said opening to locate said arm rest to one side of said opening in an operative position, and a second position wherein the opposite side of said member closes said opening with said other edge portion thereof in engagement with said panel adjacent the other of said opposite edge portions of said opening to locate said arm rest to the other side of said opening in an out-of-the-way position, and means engageable with said hinge pin means in said first and second positions of said member to retain said other edge portion thereof in engagement with said panel adjacent said opposite edge portions of said opening therein.

5. In combination with a vehicle body panel having an opening therein, an arm rest support member having one edge portion thereof coextensive with opposite edge portions of said opening and the other edge portion thereof extending beyond opposite edge portions of said opening, an arm rest mounted on one side of said member, hinge pin means secured to said support member, means rotatably mounting said hinge pin means on said panel to mount said member on said panel for movement between a first position wherein one side of said member closes said opening, with said other edge portion thereof in engagement with said panel adjacent one of said opposite edge portions thereof to dispose said arm rest to one side of said opening in an operative position, and a second position wherein the opposite side of said support closes said opening with said other edge portion thereof in engagement with said panel adjacent the other of said opposite edge portions thereof to dispose said arm rest to the other side of said opening in an out-of-the-way position, and resilient means on said panel engageable with said hinge pin means in said first and second positions thereof to retain said member in said positions with said other edge portion thereof in engagement with said panel adjacent said opening therein.

References Cited in the file of this patent

UNITED STATES PATENTS

| 1,894,621 | Lehman | Jan. 17, 1933 |
| 1,902,730 | Shaw | Mar. 21, 1933 |
| 2,088,709 | Lejuste | Aug. 3, 1937 |

FOREIGN PATENTS

| 485,249 | Canada | July 29, 1952 |
| 1,043,403 | France | June 19, 1953 |
| 510,968 | Great Britain | Aug. 11, 1939 |